United States Patent [19]

East, Jr. et al.

[11] Patent Number: 4,901,829
[45] Date of Patent: Feb. 20, 1990

[54] FRICTIONAL SHOCK ABSORBER ENCLOSED WITHIN A HOUSING

[75] Inventors: George H. East, Jr., Sudbury; Robert E. Roemer, Bolton; Karl A. Chapsky, Newton, all of Mass.

[73] Assignee: Stone & Webster Engineering Corp., Boston, Mass.

[21] Appl. No.: 169,325

[22] Filed: Mar. 17, 1988

[51] Int. Cl.⁴ .................. F16F 11/00; B60T 7/12; F16L 3/00

[52] U.S. Cl. .................... 188/381; 188/129; 248/49

[58] Field of Search .............. 188/67, 134, 381, 129, 188/378, 266, 271; 267/134; 248/49, 70, DIG. 1

[56] References Cited

U.S. PATENT DOCUMENTS

| | | | |
|---|---|---|---|
| 2,476,154 | 7/1949 | Lohs | 188/67 X |
| 2,562,595 | 7/1951 | Blue | 267/134 |
| 2,928,507 | 3/1960 | Thompson | 188/129 X |
| 3,054,478 | 9/1962 | Rumsey | 188/129 X |
| 3,603,577 | 9/1969 | De Raad | 188/129 |
| 3,666,057 | 5/1972 | Leifer et al. | 188/381 |
| 3,709,522 | 1/1973 | Olson | 188/129 X |
| 3,796,288 | 3/1974 | Hollnagel | 188/129 |
| 3,819,014 | 6/1974 | Mortensen | 188/381 |
| 3,820,634 | 6/1974 | Poe | 188/129 |
| 3,866,724 | 2/1975 | Hollnagel | 188/129 |
| 4,425,987 | 1/1984 | Porter | 188/67 |

FOREIGN PATENT DOCUMENTS

| | | | |
|---|---|---|---|
| 728029 | 10/1942 | Fed. Rep. of Germany | 188/67 |
| 116939 | 6/1985 | Japan | 188/134 |
| 1146495 | 3/1985 | U.S.S.R. | 267/134 |

Primary Examiner—Robert J. Oberleitner
Attorney, Agent, or Firm—Hedman, Gibson Costigan & Hoare

[57] ABSTRACT

A shock absorbing device having an axial friction brake for the minimization of dynamic motion while allowing motion, seen as especially useful as an alternative to, or in the replacement of, snubber devices. The shock absorbing device has a movable shaft which is attached to the object to be supported during dynamic motion at one end and a frictional surface which contacts a brake assembly at the other. The brake assembly is located within a housing, which is directly or indirectly attached to a nonmovable support, and is provided with one or more friction pads which contact the frictional surface. The brake assembly may be adjustable for varying load amplitude.

18 Claims, 4 Drawing Sheets

U.S. Patent    Feb. 20, 1990    Sheet 1 of 4    4,901,829

FRICTIONAL SHOCK ABSORBER ENCLOSED WITHIN A HOUSING

FIELD OF THE INVENTION

The present invention relates to an axial friction brake designed to minimize piping dynamic motion while accomodating thermal expansion.

BACKGROUND OF THE INVENTION

Snubbers are active hydraulic or mechanical devices designed to move freely under static loads while being able to absorb shocks of dynamic loads. Static loads are defined as slow varying loads where dynamic loads are defined as rapidly varying loads. Although these devices are theoretically desirable and widely used, they have proven unreliable in devices provide an alternative to snubbers.

Hydraulic frictional shock absorbers are disclosed in U.S. Pat. Nos. 2,929,507 (Thompson) and 3,054,478 (Rumsey). Thompson teaches a friction and fluid shock absorber wherein a number of successive shocks causes fluid to enter an outer portion of the piston thereby forcing a friction ring outward against the inner face of the cylinder. Rumsey discloses a friction hydraulic snubber wherein friction shoes are forced out against the barrel by action of a wedge shaped hydraulic piston, the load on the shoes varying accordingly with the velocity of the piston. The pistons return to their original position after the load has been removed by one or more springs. Hydraulic devices, however, are subject to leakage and valve problems, as well as corrosion, which inhibit proper movement.

Wedge-type frictional shock absorbers or resistors are disclosed in U.S. Pat. No. 3,796,288 (Hollnagel '288), 3,866,724 (Hollnagel '724) and 3,820,634 (Poe). These patents disclose the use of wedge-shaped internal friction structures to absorb the energy of a shock. Hollnagel '724 and Poe each employ a spring located around a moving piston to return the piston to its original position. Hollnagel '288 does not use a spring but rather utilizes a frictional wedge which is beveled on both sides, which cooperates with a V-shaped fixture about the piston. After compressive motion, the piston moves back to the original position by the opposing side of the V-shaped fixture contacting the opposing side of the wedge. Frictional shock absorbers have drawbacks including corrosion and contamination, i.e., oil, which causes inconsistent reactions to similar forces within the device.

A frictional brake type buffer device is disclosed in U.S. Pat. No. 3,603,577 (De Raad). The De Raad disclosure utilizes a spring and torsion bar to absorb the energy. The spring helps absorb energy and returns the piston to its original position while the torque in the torsion bar is applied to a pair of brake shoes, carried by the piston, which contact the interior of the cylinder to convert the remaining energy to heat.

Snubbers are, despite numerous problems in current design, extensively used in industry. One major area where such a device is used is in nuclear power plants where dynamic loads in piping are prevalent. Shock absorbers are necessary to support piping in nuclear plants which carries coolant fluid to and heated fluid (e.g. steam) away from the reactor, etc. Static load is seen in a nuclear plant setting during thermal expansion or contraction of the piping when the piping is exposed to variable temperature conditions. Dynamic motion is most easily seen during an earthquake. Here, many such shock absorbing supports are necessary and inspections, repair and replacements are very costly.

It is therefore a primary object of this invention to provide an axial frictional shock absorption device which minimizes piping dynamic motion while accomodating thermal expansion.

It is a further object of this invention to provide an axial frictional shock absorber which readily adjusts to changes in load arising from the force generated by shocks.

It is a still further object of this invention to provide such an axial frictional shock absorber which is both reliable and efficient.

It is a further object of this invention to provide an axial frictional shock absorber which is easy to install and replace existing snubbers.

SUMMARY OF THE INVENTION

The present invention relates to a shock absorbing device comprising:

a shaft having a first end attached to an object to be supported and a frictional surface at a second end, said shaft adapted to move axially when said object is subjected to motion;

a housing attached to a non-movable support and comprising a means for receiving the shaft at one end; and a brake assembly operatively connected to the housing and comprising at least one frictional surface engaging means adapted to engage under pressure the frictional surface of the shaft to thereby at least partly restrain the axial movement of the shaft.

BRIEF DESCRIPTION OF THE DRAWINGS

The following drawings in which like reference characters indicate like parts are illustrative of embodiments of the invention and are not intended to limit the scope of the invention as encompassed by the claims forming part of the application.

FIG. 4b is a side elevational view of the end plate shown in FIG. 4a.

FIG. 6b is a side elevational view of the attachment tube shown in FIG. 6a.

DETAILED DESCRIPTION OF THE PREFERRED EMBODIMENT

Figure 1:
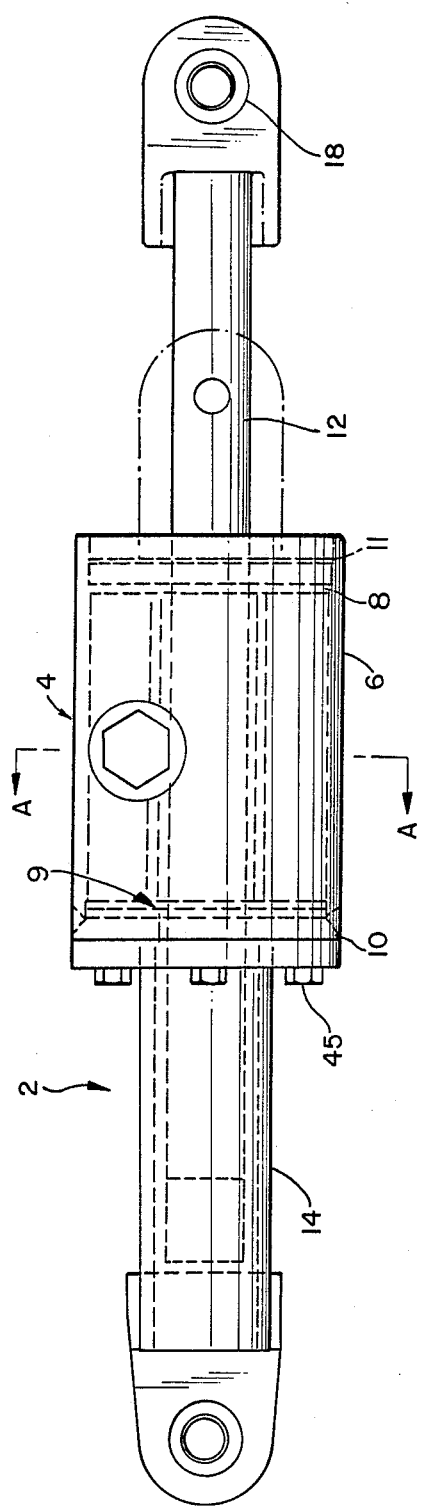
FIG. 1 is a side elevational view of a first embodiment of the present invention.

With reference to the drawings, and particularly FIG. 1, the shock absorbing device 2 of the first embodiment of the present invention comprises a stationary housing 4 comprising a housing body 6 and two end plates 8 and 10. Extending from the end plate 8 is a movable shaft 12 which can contact, or be attached to, the object to be supported during dynamic motion, i.e., piping (not shown). An attachment tube 14 is used in the present embodiment to secure the shock absorbing device 2 to a non-moveable support, i.e., building structure, I-beam, etc. (not shown).

Figure 2:
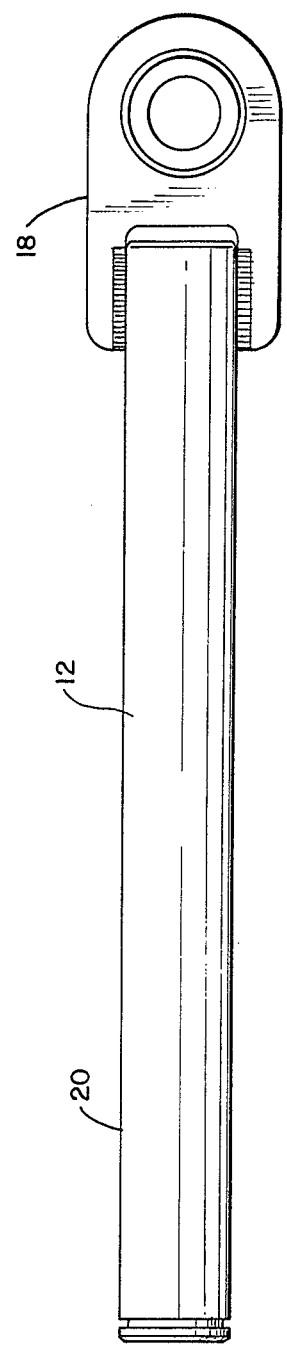
FIG. 2 is a side elevational view of the shaft of the first embodiment of the present invention.

The moveable shaft 12, shown in FIG. 2, comprises a means for attachment 18, i.e., a welded lug, screw-in member, etc., to the object to be supported (not shown) on one end, and a frictional surface 20 on the other end.

Figure 3:
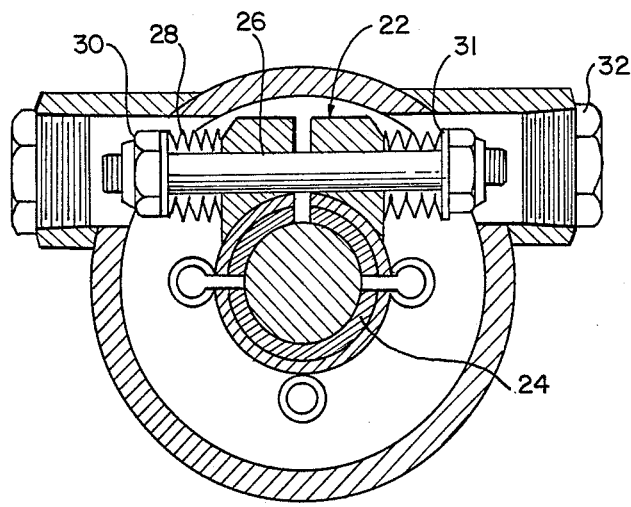
FIG. 3 is a cross-sectional view taken through line A—A of FIG. 1.

As seen in FIG. 3, a brake assembly 22 is located within the housing 4. The brake assembly 22 comprises at least one friction pad 24 which is adapted to contact the frictional surface 20 of the shaft 12. The brake assembly 22, including friction pad 24, is clamped over the frictional surface 20. Compression of the brake assembly 22 is adjusted about the frictional surface 20 by a threaded rod 26, springs 28 and locknuts 30 over washers 31 through the brake assembly 22. Plugs 32 in the housing body 6, located corresponding to the adjustment locknuts 30, allow tightening or loosening of the locknuts 30. Tightening or loosening of the locknuts 30 provides adjustment of the frictional force of the frictional pad 24 on the frictional surface 20. Adjustment of the frictional force of the pad 24 against the frictional surface 20 enables variation of the necessary force, having to do with the load amplitude, required to move the frictional surface 20 through the brake assembly 22. The brake assembly 22 can be directly or indirectly secured within the housing 4 by direct or indirect attachment to the housing body 6 and/or the housing end plates 8 and 10. Direct attachment is shown in FIG. 1 wherein the brake assembly 22 abuts the housing end plates 8 and 10 thereby stopping axial movement of the brake assembly 22 within the housing 4.

Figure 4A:
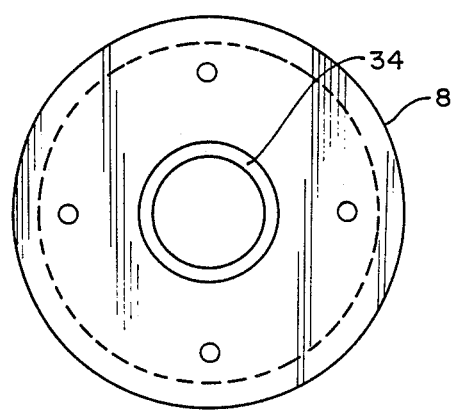
FIG. 4a is a front elevational view of an end plate mounted on the housing of the first embodiment of the present invention.
Figure 4B:
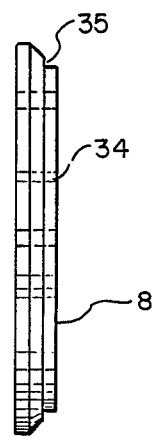

The shaft 12 enters the housing 4 through an aperture 34 in the end plate 8, which may include bushings, gromets, etc. and combinations thereof, as shown in FIGS. 4a and 4b.

Figure 5A:
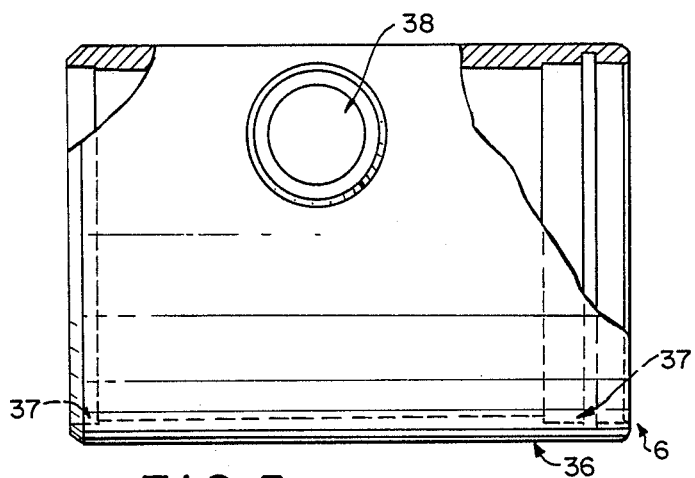
FIG. 5a is a side elevational view of the housing body of the first embodiment of the present invention.
Figure 5B:
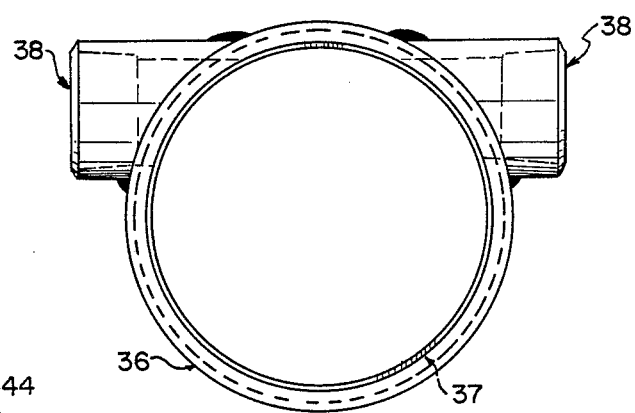
FIG. 5b is a front elevational view of the housing body of the first embodiment of the present invention.

The housing body 6, seen in FIGS. 5a and 5b, comprises one or more walls 36 which laterally cover the internal features, i.e. brake assembly 22, frictional surface 20, etc., of the shock absorbing device 2. At each end of the wall or walls 36 is a means 37 for accepting the end plates 8 and 10 of the housing 4 comprising preferably a groove around the edge of the housing body 6 (see FIGS. 5a and 5b) which relates to a groove 35 about the edge of the end plates 8 and 10. A means 11 for securing/protecting the contact between the housing body 6 and end plates 8 and 10, as well as protecting the internal mechanisms of the housing 4 from contaminants, (shown in FIG. 1) may be placed between the housing body 6 and end plates 8 and 10. The securing/protection means 11 may include, for example, snaprings, gromets, welds, etc. and combinations thereof. The housing body 6 preferably includes one or more apertures 38 which provide access to the adjustment locknuts 30. The apertures 38 can be sealed by plugs 32 when not being adjusted.

Figure 6A:
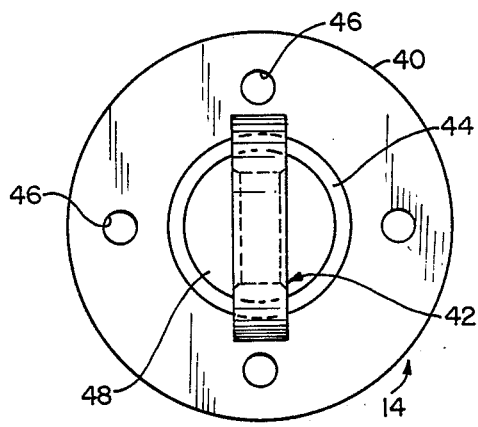
FIG. 6a is a front elevational view of the attachment tube used to attach the shock absorbing device of the present invention to a non-moveable support.
Figure 6B:
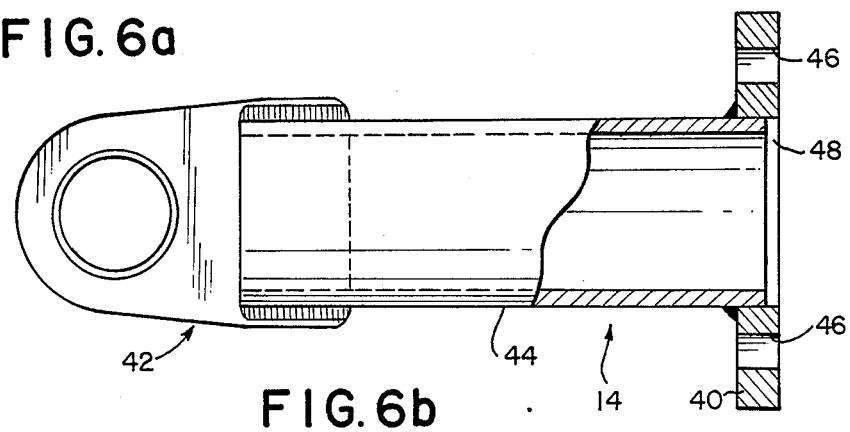

One preferred means for securing the shock absorbing device 2 to a non-moveable support comprises an attachment tube 14, illustrated in FIGS. 6a and 6b. The attachment tube 14 has an attachment plate 40 to attach the attachment tube 14 to the housing 4 on one end, a means 42 for attaching the tube 14 to the non-moveable support on the other end and a tube 44 which connects the two ends.

The use of such an attachment tube 14 for securing the device 2 to the non-moveable support is preferred to limit the overall size of the device 2. When the attachment tube 14 is employed, the end plate 10, downstream of the shaft 12, accepts the attachment plate 40 of the attachment tube 14, by a means for attachment 45, e.g., bolts, screws, rivets, etc., preferably bolts or screws passing through apertures 46 in the attachment plate 40. In a preferred embodiment, both the end plate 10 and the attachment plate 40 have apertures 34 (see FIGS. 4a and 4b) and 48, respectively which receive the end of the shaft 12 comprising the frictional surface 20. Likewise, the preferred embodiment comprises the tube 44 which is hollow and is of a size and shape enabling the shaft 12, or frictional surface 20 to be received therein thereby providing lateral and axial support to the shaft 12 and limiting the overall size of the device.

The moveable shaft 12 is guided axially by the housing end plate 8, which accepts or receives the shaft 12, and the opposite end plate 10 or an extension thereof. Axial guidance by an aperture 9 in the opposite end plate 10 is described above and seen in FIG. 1. Axial guidance of the shaft 12 can also be achieved by an extension 50 secured on the internal side of the end plate 10 as seen in FIG. 7.

The shock absorbing device 2 of the present invention is attached to a non-movable support and the object to be supported during dynamic motion by the attachment means 18 on the shaft 12. The load amplitude necessary to move the frictional surface 20 through the friction pads 24 is adjusted to provide adequate support for the conditions present by adjustment of the locknuts 30 on the threaded rod 26 through the brake assembly 22. Upon the application of dynamic force greater than the adjusted load amplitude to the object to be supported, the shaft 12, guided axially by the end plates 8 and 10 which directly or indirectly contacts the shaft 12, moves the frictional surface 20 across the friction pads 24 held by the brake assembly 22 within the housing 4.

Figure 7:
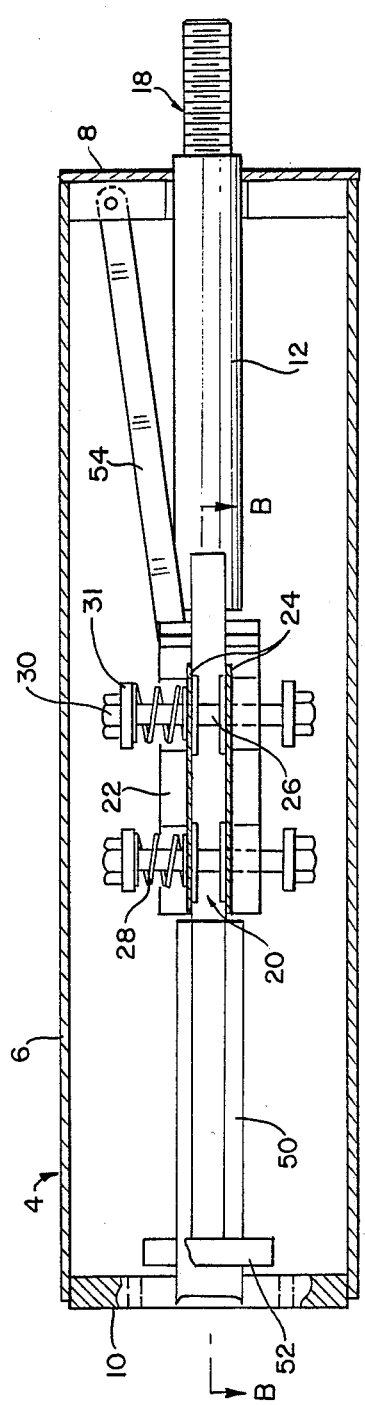
FIG. 7 is a side cross-sectional view of a second embodiment of the present invention.
Figure 8:
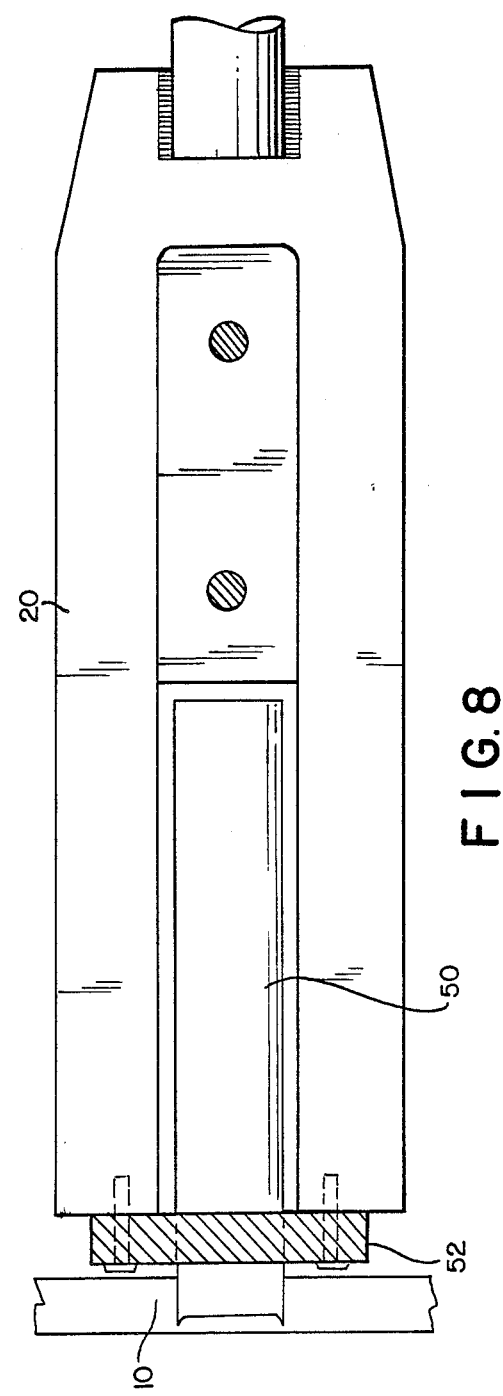
FIG. 8 is a cross-sectional view taken through line B—B of FIG. 7.

Another embodiment of the shock absorbing device 2' of the present invention is seen in FIGS. 7 and 8.

As seen in FIG. 8, the frictional surface 20' of the shaft 12 can be an attachment to the shaft 12, rather than the shaft 12 itself. In this embodiment, the frictional surface 20' may have an attachment, e.g., a plate 52 comprising a means for accepting the extension 50 secured to the internal side of the end plate 10, or alternatively the frictional surface 20' may comprise a hollow tube (not shown) for accepting an extension 50 secured to the internal side of the end plate 10, which moves about the extension 50, for axial guidance and lateral support.

As illustrated in FIG. 7, the brake assembly 22' can be adapted to work on a frictional surface 20' which is substantially flat, rather than round as shown in FIG. 3. This embodiment demonstrates a means for securing the brake assembly 22' in the housing 4 by indirect contact with the housing 4 through the use of brake arms 54 which can be secured to the housing 4', i.e., housing body 6, and/or end plates 8 and 10.

The friction pads 24 contemplated for use in this invention should be selected to avoid deterioration in the desired environment, to slide smoothly without sticking and to provide reasonably constant frictional force despite potential contamination by oil or water. The preferred material is a composite containing high strength graphite fibers in a graphite matrix, such as FIBERCARB CL" manufactured by Fiber Materials, Inc., Biddeford Industrial Park, Biddeford, ME 04005.

Many variations will suggest themselves to those skilled in the art in light of the above detailed description. For example, a square movable shaft could be used with a flat brake assembly which moves within an internal support or with a support plate which contacts the side housing for support rather than an end plate. All such obvious variations are within the full intended scope of the appended claims.

We claim:

1. A shock absorbing device comprising:
    a shaft having a first end, to be attached to an object to be supported by a means of attachment, and a frictional surface of uniform width at a second end, said shaft adapted to move axially, without rotational movement, when said object to be supported is subjected to motion;
    a housing to be attached to a non-moveable support and comprising a means for receiving at least a portion of the shaft;
    a brake assembly located within the housing and operatively connected to the housing and comprising at least one frictional surface engaging means, adapted to engage under pressure the frictional surface of the shaft to thereby at least partly restrain the axial movement of the shaft, and an adjustment means for adjusting the pressure of the frictional surface engaging means against the frictional surface to provide variable uniform resistance to linear motion depending on load amplitude.

2. The shock absorbing device defined in claim 1 wherein the means for receiving the shaft comprises an end plate on the housing containing an aperture, said shaft being insertable into the aperture.

3. The shock absorbing device defined in claim 1 wherein the adjustment means comprises at least one spring compressed by locknuts on threaded rods passing through the brake assembly.

4. The shock absorbing device defined in claim 3 wherein the adjustment means comprises at least one aperture containing a locknut, said locknuts being reversibly moveable to thereby adjust the pressure of the frictionals surface engaging means against the frictional surface.

5. The shock absorbing device defined in claim 4 further comprising a means for sealing the locknut adjustment apertures.

6. The shock absorbing device defined in claim 5 wherein the sealing means comprises removable plugs.

7. The shock absorbing device defined in claim 1 wherein the frictional surface of the shaft comprises an attachment to the shaft.

8. The shock absorbing device defined in claim 1 wherein the housing is attached to the non-movable support by a means for attachment comprising an attachment tube located downstream of the shaft and housing.

9. The shock absorbing device defined in claim 8 wherein the attachment tube is hollow to accept the frictional surface when the shaft is in its compressed position, thereby providing lateral support to the shaft and limiting the overall size of the shock absorbing device.

10. The shock absorbing device of claim 8 wherein the shaft is axially guided by movement through an aperture in the housing end plate opposing the means for receiving the shaft and insertion and movement into the attachment tube.

11. The shock absorbing device of claim 1 wherein the means for attaching the shaft to the object to be supported during dynamic motion comprises a welded lug.

12. The shock absorbing device of claim 1 wherein the means for attaching the device to the non-moveable support comprises a welded lug.

13. The shock absorbing device defined in claim 1 further comprising a means for securing the brake assembly within the housing.

14. The shock absorbing device defined in claim 13 wherein the securing means comprises at least one brace arm.

15. The shock absorbing device defined in claim 1 further comprising means for axial support of the shaft.

16. The shock absorbing device defined in claim 1 wherein the friction surface engaging means comprises a material which slides relatively smoothly and provides constant frictional force despite the presence of one or both of oil and water.

17. The shock absorbing device defined in claim 16 wherein the frictional surface engaging means comprises a composite containing high strength graphite fibers in a graphite matrix.

18. The shock absorbing device defined in claim 1 comprising an internal shaft insertable into and securely contacting an aperture in an attachment to the frictional surface end of the shaft to provide lateral support.

* * * * *